United States Patent
Linebarger et al.

(10) Patent No.: US 7,203,649 B1
(45) Date of Patent: Apr. 10, 2007

(54) APHASIA THERAPY SYSTEM

(75) Inventors: Marcia C. Linebarger, Elkins Park, PA (US); John F. Romania, Phoenixville, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/060,313

(22) Filed: Apr. 15, 1998

(51) Int. Cl.
*G10L 21/00* (2006.01)

(52) U.S. Cl. ............... 704/270; 704/271
(58) Field of Classification Search .............. 704/9, 704/257, 270, 271, 272, 275; 434/167, 176
See application file for complete search history.

(56) References Cited

U.S. PATENT DOCUMENTS

| | | | |
|---|---|---|---|
| 5,357,596 A * | 10/1994 | Takebayashi et al. | 704/275 |
| 5,487,671 A * | 1/1996 | Shpiro et al. | 434/185 |
| 5,562,453 A * | 10/1996 | Wen | 434/185 |
| 5,618,180 A * | 4/1997 | Nathanson | 434/156 |
| 5,766,015 A * | 6/1998 | Shpiro | 434/156 |
| 5,791,904 A * | 8/1998 | Russell et al. | 434/185 |
| 5,870,709 A * | 2/1999 | Bernstein | 704/275 |
| 5,920,838 A * | 7/1999 | Mostow et al. | 704/255 |

FOREIGN PATENT DOCUMENTS

| | | | |
|---|---|---|---|
| EP | 1013222 A1 * | 5/2000 |
| JP | 409122106 A * | 5/1997 |

\* cited by examiner

*Primary Examiner*—Angela Armstrong
(74) *Attorney, Agent, or Firm*—Mark T. Starr; RatnerPrestia

(57) ABSTRACT

A computer-operated speech therapy system is provided that includes speech input, speech recognition and natural language understanding, and audio and visual outputs to enable an aphasic patient to conduct self-paced speech therapy autonomously. The system of the invention conducts a therapy exercise by displaying a picture; generating a speech prompt asking the patient for information about the picture; receiving the patient's speech response and processing it to determine its semantic content; determining whether the patient's response was correct; and outputting feedback to the patient. Preferably the system includes a touch screen as a graphical input/output device by which the patient controls the therapy exercise.

33 Claims, 3 Drawing Sheets

US 7,203,649 B1

APHASIA THERAPY SYSTEM

STATEMENT REGARDING FEDERALLY FUNDED RESEARCH OR DEVELOPMENT

This invention was made with government support under grant number R01-DC-02377 awarded by the PHS. The government has certain rights in this invention.

BACKGROUND THE OF INVENTION

This invention relates to speech therapy. More particularly, this invention relates to a computer-based system that can be used to provide speech therapy to a person such as an aphasia patient. Still more particularly, this invention relates to a computer-based system that can be operated by an aphasia patient or other user in order to provide speech therapy that is self paced and does not require the participation of a human speech therapist.

Aphasia is a language disorder caused by stroke or other injury to the brain; some form of aphasia afflicts over two million Americans. Aphasia interferes with the ability to select words and assemble the selected words in accordance with syntax rules to form sentences communicating an intended meaning. Speech therapy to improve the capabilities of aphasic patients has traditionally been provided by human speech therapists who, in the course of a therapy session, instruct the patient as to linguistic tasks to be performed and evaluate the patient's performance of the tasks. While such therapy can be effective, there are several drawbacks in the use of humans to supervise and monitor patients practising to regain speech capabilities. Use of a trained speech therapist is expensive and patient access to such therapists may be limited by economic considerations or by the scarcity of therapists. Therapy sessions generally must be conducted when time with a therapist can be scheduled, rather than on an ad hoc basis when a patient desires therapy. Moreover, a therapist appearing to wait impatiently while an aphasic patient struggles unsuccessfully to find a word may make the patient feel uncomfortable with the therapy and inhibit progress.

Computer technology has been employed to assist aphasic patients. However, known computer-based systems do not provide an aphasic patient with speech therapy of the sort conducted by human therapists.

SUMMARY OF THE INVENTION

It is therefore a general object of the invention to provide a method for assisting aphasic patients in improving their speech that does not require a human therapist. It is a further object of the invention to provide computer-based system implementing such speech therapy method. In accordance with the invention, a computer-operated system is provided that includes speech input, speech recognition and natural language understanding, and audio and visual outputs to enable an aphasic patient to conduct self-paced speech therapy autonomously. The system of the invention conducts a therapy exercise by displaying a picture; generating a speech prompt asking the patient for information about the picture; receiving the patient's speech response and processing it to determine its semantic content; determining whether the patient's response was correct; and outputting feedback to the patient. Preferably the system includes a touch screen as a graphical input/output device by which the patient controls the therapy exercise. Preferably the system of the invention conducts such therapy exercises in a variety of grammatical structures with which an aphasic patient may need retraining. These and other objects and features of the invention will be understood with reference to the following specification and claims, and the drawings.

DETAILED DESCRIPTION

Figure 1:
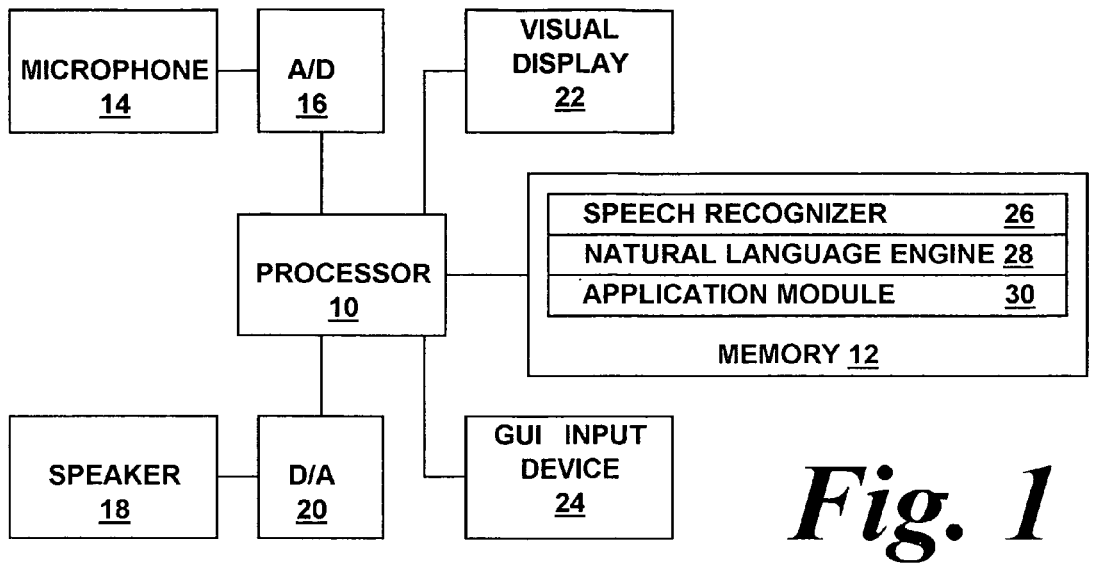
FIG. 1 is a block diagram illustrating the functional elements of a preferred system in accordance with the present invention.

The present invention is preferably implemented as a multimedia computer system including audio input and output and a visual display, the computer system operating in accordance with stored instructions to effect the method of the present invention and provide a speech therapy system in accordance with the present invention. The preferred system incorporates speech recognition, a natural language understanding system, a touch screen, and pictures in a series of exercises designed to retrain specific grammatical structures. The system is preferably able to conduct exercises that progress from simple active sentences ("the fireman carries the ballerina") to prepositional phrases ("the bird is behind the glass"), notoriously difficult for most aphasic patients, and to more complex structures incorporating prepositional phrases ("the man throws the book from the tower"). Patients view pictures and describe the events depicted in these pictures by speaking into microphone. Since all aphasics experience word-finding difficulties, a touch screen is desirably incorporated into the system; with a touchscreen patients can find out the name of a pictured item by touching it, and cues for verbs and prepositions may be made available via icons. The speech recognizer and the natural language understanding system interpret the patients' utterances, giving feedback (preferably both musical and visual) about the correctness of their picture descriptions. There are several reasons why spoken natural language understanding is so desirable in a therapy system for aphasic patients. For one thing, it allows aphasic patients to practice language in the most important modality, speech. Also, many aphasics have severe difficulty with reading and writing, and simply could not use a computer-based therapy system if it required these skills. In addition, natural language processing capability is necessary in order to give patients feedback about whether they are putting words together into sentences correctly. A system with a speech recognizer alone, without natural language understanding, could detect whether the patient has produced a single word or string, but in order to assess the correctness of a spoken sentence it is necessary to analyse its grammatical structure and compare its meaning with the picture on display, since the same idea can be expressed in different ways. Against the foregoing background, preferred embodiments of the invention as depicted in the drawings will be described.

FIG. 1 is a block diagram representing at a very general level the functional elements of a computer-based speech therapy system in accordance with the present invention. The system includes a processor 10 operating under control of software stored in memory 12. A microphone 14 converts input sounds into electrical signals that are digitized by A/D converter 16 and stored in memory 12 under control of processor 10. Stored data representing sounds are converted to analog signals by D/A converter 20 and output as sounds by speaker 18. The system of FIG. 1 may be implemented using a conventional personal computer (PC) having a sound card coupled to a microphone and speaker. Visual information is output to a user by a visual display 22, such as a CRT or LCD display. Preferably the system has a graphical user interface whereby control information to navigate the system is input from a user by a GUI input device 24 such as mouse, trackball or the like; but because aphasic patients may have difficulty operating such devices it is particularly preferred that input device 24 comprises a touch screen overlying visual display 22. The system hardware in FIG. 1 is generally conventional and may be embodied by a PC; software stored in memory 12 operates the system to conduct speech therapy in accordance with the present invention. Applicants have developed such a system in which the software included three principal functional elements as shown in FIG. 1: a speech recognizer 26, a natural language engine 28, and a PC application 30. Applicants used speech recognition software commercially available from Lernout & Hauspie Speech Products for speech recognizer 26. Applicants developed a natural language engine 28 for speech therapy using the Pundit natural language development environment of Unisys Corporation. Applicants also developed a PC application 30 to interface the natural language engine 28 to the PC system hardware and software. It is believed to be well within the ordinary skill in the art to develop specific natural language processing and interface software to implement such particular therapy systems as may be desired.

Figure 2:
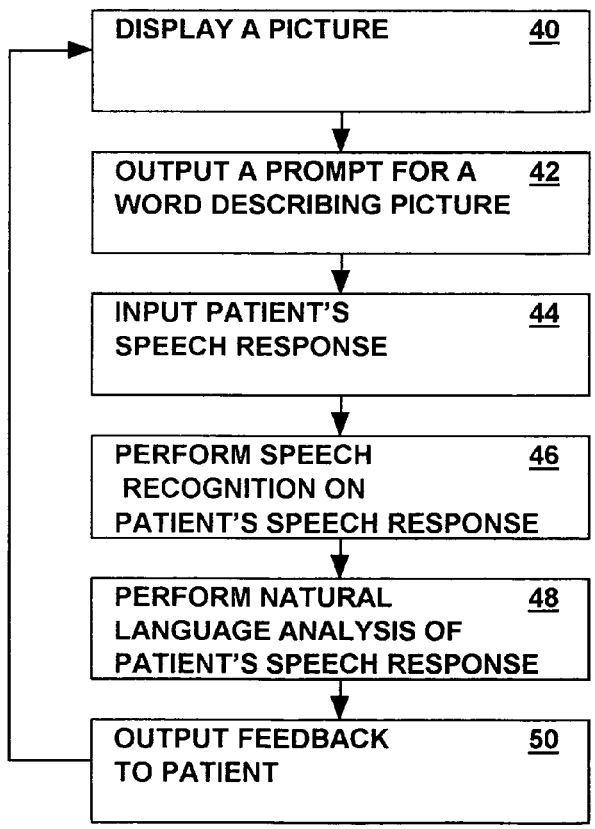
FIG. 2 is a flow diagram illustrating the basic operation of a speech therapy system in accordance with the present invention.

FIG. 2 is a flow diagram illustrating the basic operation of a speech therapy system in accordance with the present invention. In step 40, the system displays a picture on the display 22 of FIG. 1 based upon data stored in memory 12. The pictures are selected or created so as to provide particular linguistic elements or structures that are desired to be tested or practised in a therapy session. In step 42, the system outputs a prompt to the user for a word to describe the picture, or an aspect of the picture. Aphasic patients may have difficulty reading a text prompt, and since the system is intended to exercise a patient's spoken language capabilities, preferably the prompt generated in step 42 is a computer-generated speech prompt that is output from speaker 18 based upon data stored in memory 12. In order to provide accurate and natural speech prompts as well as spoken feedback to the patient, applicants prefer to generate them from digitized and stored human speech rather than synthesizing them. In step 44, the patient's speech response to the prompt is input, digitized, and stored. In step 46, speech recognition is performed upon the data representing the patient's speech response, to provide data representing the words comprising the response. In step 48, the data representing the words comprising the patient's speech response is subjected to natural language analysis to evaluate its correctness, i.e. did the patient correctly give the information about the picture that was requested by the prompt of step 42. In step 50, the system outputs feedback to the patient regarding the correctness of the patient's response. Preferably the feedback includes both spoken feedback telling the patient that the response was or was not correct and musical feedback to make using the system enjoyable for the patient, such as a fanfare for correct responses and a horn for incorrect responses. The system may then return to step 42 and generate a prompt for additional information about the same picture, or to step 40 and display a new picture.

Figure 3:
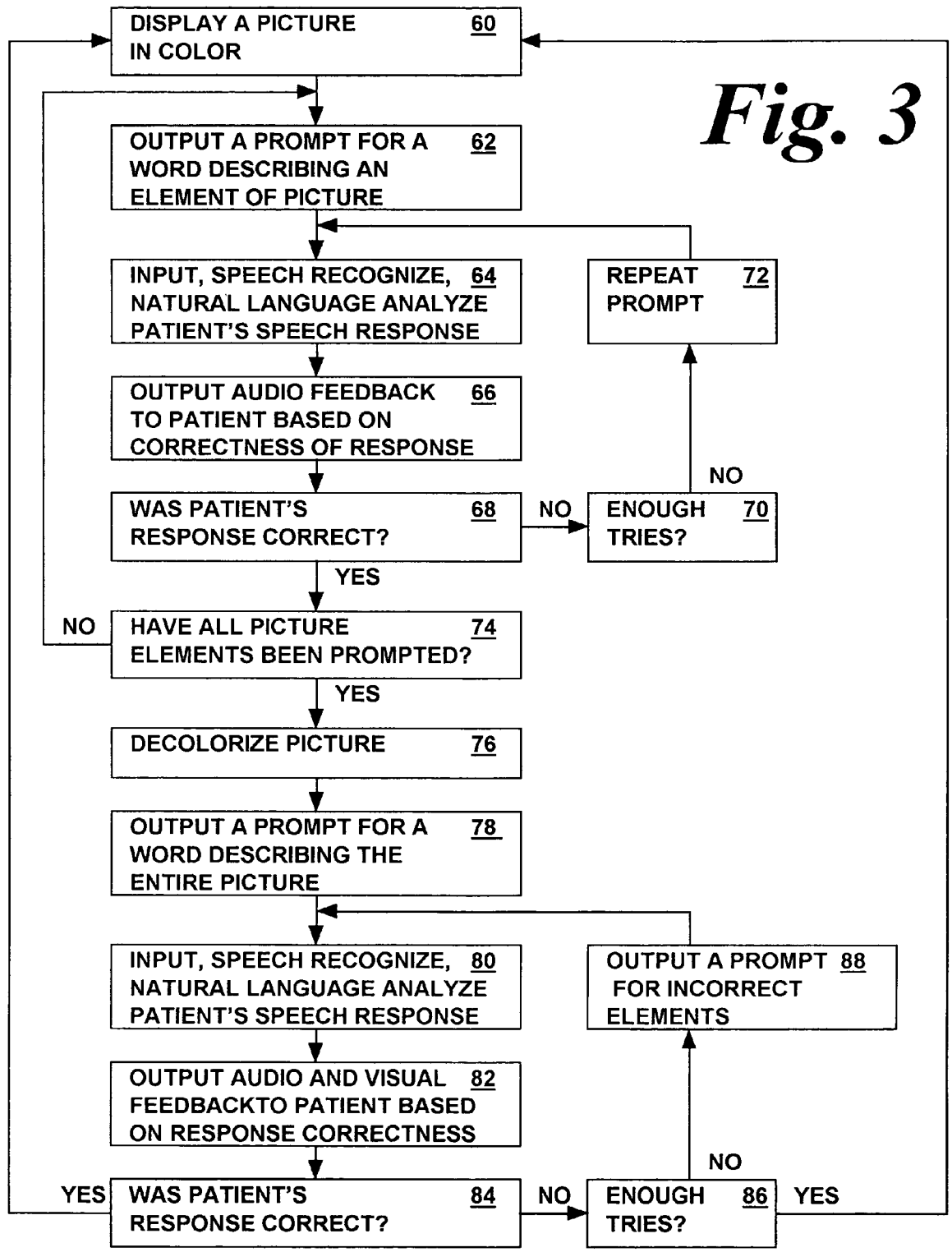
FIG. 3 is a more detailed flow diagram illustrating the operation of a preferred speech therapy system in accordance with the present invention.
Figure 4:
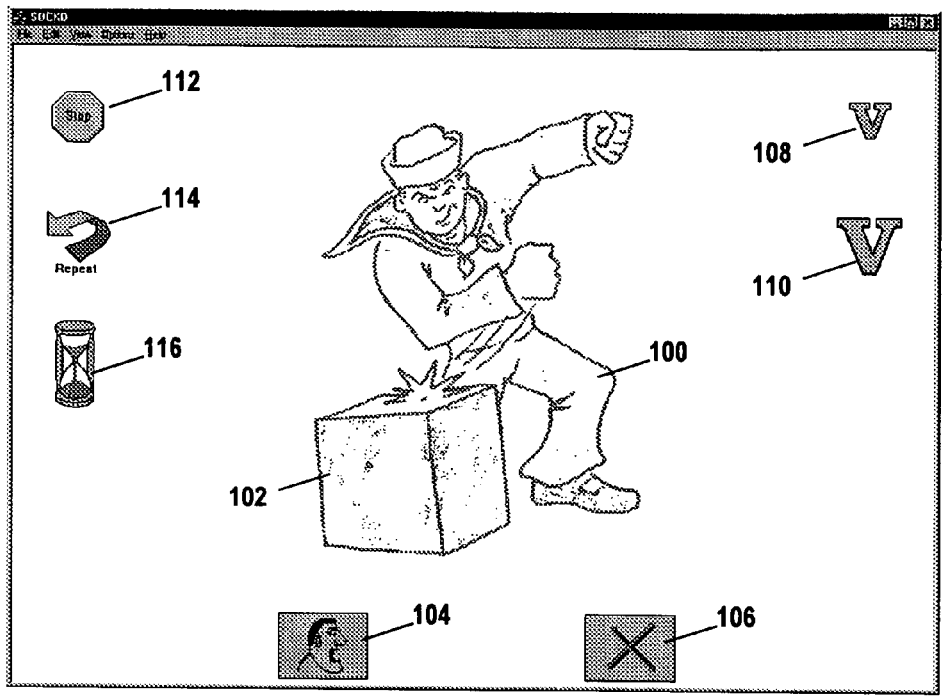
FIGS. 4 and 5 are illustrations of visual displays that may be generated by a speech therapy system in accordance with the present invention.
Figure 5:
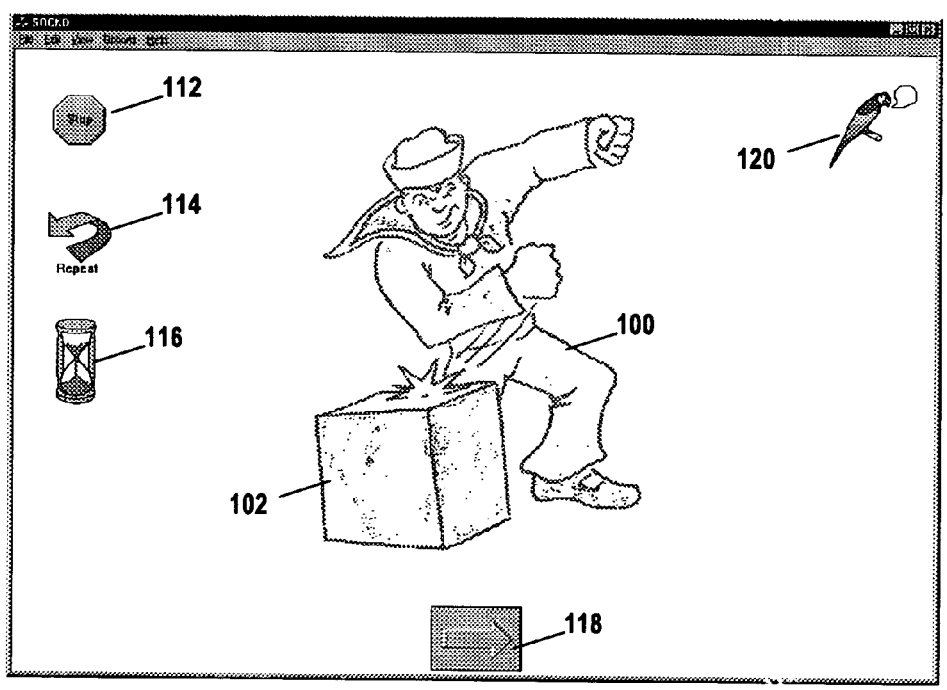

FIG. 3 is a more detailed flow diagram illustrating the operation of a preferred speech therapy system in accordance with the present invention in an example of a therapy exercise that may generate displays as illustrated in FIGS. 4 and 5. In the example, the picture in FIGS. 4 and 5 shows a man 100 dressed as a sailor hitting a box-like object 102. In step 60, the system displays the picture in color. In step 62, the system outputs a prompt to the user for a word to describe an aspect of the picture; for instance, the system might generate the spoken prompt "Please look at this picture. What is a good verb to describe the action here?" If the user cannot think of an appropriate word, a pair of buttons 108, 110 is provided to assist the user with an auditory cue. In exercises to find appropriate verbs the buttons are designated with the letter "v"; pressing the small v button 108 causes the system to output the initial consonant+vowel sound of the desired verb, and pressing the large V button 110 outputs the entire desired verb. In exercises to find appropriate prepositions the buttons might be designated with the letter "p". In response to the prompt, the user presses recording start button 104, vocalizes the response to the prompt, and presses recording stop button 106 at the end of the response. Preferably pressing the record start button 104 causes visual feedback to indicate that the system is recording, such as coloring the button. In step 64, the system inputs this speech response, speech recognizes and natural language analyzes it, as in steps 44–48 of FIG. 3. The system is desirably programmed to accept certain synonyms as appropriate responses to the prompts; for instance, the system may accept "hit" and "punch" as appropriate verbs to describe the picture in FIG. 4. In step 66 the system outputs audio feedback indicating its determination of the correctness of the user's response. Preferably, the feedback consists of both a musical output and a speech output. Thus if the response was incorrect, in step 66 the system might play harsh or sad music and, if the user has not made a predetermined number of attempts to correctly respond to the prompt, as determined in step 70, in step 72 the system might repeat the prompt: "Please try again. What is a good verb to describe the action in this picture?" If the response was determined in step 64 to be acceptable, the appropriate audio feedback is output in step 66. For instance, if the user said "punch", a correct response to the prompt, the system might play a musical fanfare and then say "you're right, punch is a good word for this picture, but the verb we will be using is hit" in order to alert the user to words the system will use in further prompts or spoken feedback. In step 74, a determination is made as to whether there are further elements of the displayed picture to be prompted for. For instance, in addition to prompting for verbs, the therapy program might also provide practice in identifying sentence subjects or objects, or prepositions. If so, the system returns to step 62 and outputs a prompt for another element of the displayed picture. For instance, with the picture shown in FIGS. 4 and 5, the system might generate a speech output of "What is the sailor hitting?" or "Who is hitting the box?" User cues are also provided for nouns; touching a displayed object causes a speech output of the name of the object. Once all elements of a picture that are to be prompted for individually have been prompted and responded to, the system seeks a sentence describing the entire picture. To assist in giving feedback regarding partially correct responses, in step 76 the picture is "decolorized" and rendered in black and white. In step 78, the system outputs a prompt to the user for a sentence describing the entire picture; for instance, the system might generate the spoken prompt "now please try to say the whole sentence." The user's spoken response to the prompt is again input, speech recognized, and natural language analyzed to determine its correctness in step 80. It is here that the inclusion of natural language processing provides the system of the invention with the ability to autonomously conduct useful therapy involving fairly complex utterances. By analyzing the semantic content of the spoken response, the system can judge as correct a number of different utterances that are equally appropriate but have different phraseology. For instance, for the picture of FIGS. 4 and 5, by natural language processing of the recognized words in the patient's response, the system can judge the responses "The man hits the box", "The sailor is hitting the block", and "The box is being punched by the man" as equally correct. In step 82, audio and preferably also visual feedback regarding the correctness the response is output. For correct responses, the system may loop to step 60 and display a new picture; pressing stop button 112 will exit the therapy program. For incorrect responses, the system permits retries in step 86. If the incorrect response is partially correct, preferably the feedback in step 82 and prompt in step 88 identify the correct parts of the response and prompt for the incorrect ones. Thus, if the patient's response was "The sailor is hitting the squirrel", the system might provide visual feedback by colorizing the sailor to show that it was correctly identified and generate the spoken feedback and prompt "Yes, you're partially right, the sailor is hitting something. What is the sailor hitting?"

Other buttons included in the interface include hourglass button 116 that shows how many minutes the patient has been working; parrot button 120 that replays the patient's last response; and repeat button 114 that replays the current system prompt.

In accordance with the foregoing, a speech therapy system is provided that is extremely motivating: patients like being able to practice before turning on the speech recognizer (unlike a human, the computer does not wait impatiently while they struggle for words), and their speech has an immediate and obvious impact on the computer, which is, in a sense, empowering since aphasia represents a terrible loss of the ability to control one's environment through language.

Variations on the systems disclosed herein and implementation of specific systems may no doubt be done by those skilled in the art without departing from the spirit and scope of the present invention.

What is claimed is:

1. A computer-implemented method for conducting speech therapy comprising:

displaying a picture, wherein the picture comprises a plurality of aspects;

generating speech prompts for information describing each of the plurality of aspects of the picture;

inputting speech responses, including user-identification of each of the plurality of aspects, performing speech recognition on the input speech responses, including the user-identification of each of the plurality of aspects to recognize words comprising the responses;

performing natural language analysis of the recognized words to determine whether the user-identification of each of the plurality of aspects accurately describes the plurality of aspects, generating a prompt to use each of the plurality of aspects in a sentence if the user-identification of each of the plurality of aspects accurately describes the plurality of aspects, receiving a sentence from said user responsive to said prompt to use each of the plurality of aspects, performing natural language analysis, to analyze the semantic content of the sentence for appropriate sentence correctness, and providing feedback to the user regarding the correctness of the semantic content of the sentence.

2. The method of claim 1, wherein the step of performing natural language analysis includes analyzing a semantic content of the recognized words.

3. The method of claim 1, wherein the step of performing natural language analysis includes judging that a plurality of possible recognized words are synonyms.

4. The method of claim 3, wherein the step of performing natural language analysis includes accepting synonyms for the recognized words.

5. The method of claim 1, wherein the step of performing natural language analysis includes analyzing a grammatical structure of the recognized words.

6. The method of claim 1, wherein the step of performing natural language analysis includes altering a visual characteristic of at least one of the aspects of the picture in response to the input speech response.

7. The method of claim 6, wherein the step of performing natural language analysis includes colorizing at least one of the aspects in response to the input speech response.

8. The method of claim 6, wherein the step of performing natural language analysis includes de-colorizing at least one of the aspects in response to the input speech response.

9. The method of claim 1, further comprising the step of replaying the speech response.

10. The method of claim 1, wherein the step of generating a speech prompt includes providing an auditory cue to the user that is activated by interacting with an icon.

11. The method of claim 10, wherein the step of generating a speech prompt includes providing an auditory cue for one of a verb and a preposition to the user that is activated by interacting with an icon.

12. A system for conducting speech therapy comprising:

a visual display for displaying a picture, the picture comprising a plurality of aspects;

a microphone adapted to capture sounds spoken by a user to describe the plurality of aspects of the picture;

a speaker adapted to output sound in response to the sounds spoken by the user;

a processor including memory coupled to the visual display device and the speaker and receiving the sounds from the microphone, the processor being programmed to:

display the picture, including the plurality of aspects;

generate speech prompts for information describing each of the plurality of aspects of the picture;

receive as inputs, speech responses, including user-identification of each of the plurality of aspects;

perform speech recognition on the input speech responses to recognize words comprising the response, including the user-identification of each of the plurality of aspects;

perform natural language analysis of the recognized words to determine whether the user-identification of each of the plurality of aspect accurately describes the plurality of aspects; and, generate a prompt to use each of the plurality of aspects in a sentence if the user-identification of each of the plurality of aspects accurately describes the plurality of aspects, receive a sentence from said user responsive to said prompt to use each of the plurality of aspects, perform natural language analysis, to analyze the semantic content of the sentence for appropriate sentence correctness, and provide feedback to the user regarding the correctness of the semantic content of the sentence.

13. The system of claim 12, wherein the processor is programmed to perform natural language analysis including analyzing a semantic content of the recognized words.

14. The system of claim 12, wherein the processor is programmed to perform natural language analysis including judging that a plurality of possible recognized words are synonyms.

15. The system of claim 14, wherein the processor is programmed to perform natural language analysis including accepting synonyms for the recognized words.

16. The system of claim 12, wherein the processor is programmed to perform natural language analysis including analyzing a grammatical structure of the recognized words.

17. The system of claim 12, wherein the processor is programmed to perform natural language analysis including altering a visual characteristic of at least one of the aspects in response to the input speech response.

18. The system of claim 17, wherein the processor is programmed to perform natural language analysis including colorizing at least one of the aspects in response to the input speech response.

19. The system of claim 17, wherein the processor is programmed to perform natural language analysis including de-colorizing at least one of the aspects in response to the input speech response.

20. The system of claim 12, wherein the processor is programmed to generate a speech prompt that provides an auditory cue to the user that is activated by interacting with an icon.

21. A computer assisted method for conducting speech therapy comprising:

displaying a picture, wherein the picture comprises a plurality of aspects;

generating a prompt for first information describing a first of the plurality of aspects of the picture;

inputting a speech response, wherein the input speech response includes a user-identification of the first aspect;

performing speech recognition on the input speech response, including the user-identified first aspect in order to recognize words comprising the input speech response;

performing natural language analysis of the recognized words to determine whether the user-identified first aspect accurately describes the first aspect;

repeating the steps of prompt generating, speech response inputting, speech recognition performing and natural language analysis performing for each of the remaining plurality of aspects, generating a prompt for second information if the user-identification of each of the plurality of aspects accurately describes the plurality of aspects, wherein the second information includes a sentence describing the entire picture, receiving a sentence from said user responsive to said prompt for second information, performing natural language analysis, to analyze the semantic content of the sentence for appropriate sentence correctness, and providing feedback to the user regarding the correctness of the semantic content of the sentence.

22. The method of claim 21, wherein said step of generating a prompt for second information is carried out only if each of the user-identifications of the plurality of aspects is determined to accurately describe the plurality of aspects of the picture.

23. The method of claim 22, wherein the step of prompting the second information is carried out a predetermined number of times, and further comprising the step of:

generating a prompt for a different sentence, the prompt being generated if, after the predetermined number of times, at least one of the user-identified aspects is determined not to accurately describe the respective aspect of the picture.

24. The system of claim 23, wherein the different sentence prompt further includes an indication of the user-identified aspects determined to accurately describe the plurality of aspects of the picture.

25. The method of claim 21, wherein the step of generating a prompt for first information and the step of generating a prompt for second information each include a speech prompt.

26. The method of claim 24, wherein the steps of generating a prompt for first information, generating a prompt for second information, and generating a different sentence prompt each include a visual prompt.

27. The method of claim 21, further comprising the step of:

generating a first tone if the user-identification of the first aspect is accurate; and, generating a second tone if the user-identification of the first aspect is not accurate.

28. A system for conducting speech therapy, comprising:

a display for displaying a picture, the picture comprising a plurality of aspects, input means for receiving a spoken description of each of the plurality of aspects of the picture by a user;

output means adapted to output a response to the spoken user description; and, processing unit means coupled to the display means, the input means, and the output means, the processing unit means being programmed to:

analyze the spoken user description of each of the plurality of aspects, to determine whether the spoken user description of each of the aspects accurately describes the respective aspect of the picture, and, generate a prompt for the user to use each of the plurality of aspects in a sentence describing the picture if the spoken user description of each of the plurality of aspects accurately describes the respective aspect of the picture, receive a sentence from said user responsive to said prompt to use each of the plurality of aspects, perform natural language analysis, to analyze the semantic content of the sentence for appropriate sentence correctness, and provide feedback to the user regarding the correctness of the semantic content of the sentence.

29. The system of claim 28, wherein said processing unit means includes:

a processor; and, a memory coupled to the processor, the memory storing:

a speech recognizer for performing speech recognition on the spoken user description in order to recognize words included in the spoken user description; and, a natural language analyzer for receiving the recognized words from the speech recognizer and for comparing the recognized words with pre-defined acceptable words describing the respective aspect of the picture, wherein the spoken user description of the aspect accurately describes the respective aspect of the picture if the recognized words match any of the pre-defined acceptable words.

30. The system of claim 29, wherein the prompt to use each of the plurality of aspects in a sentence describing the picture is a speech prompt.

31. The system of claim 29, wherein the system is implemented in a computer and the display is a computer monitor.

32. The system of claim 28, wherein the input means includes a microphone.

33. The system of claim 28, wherein the input means includes a speaker.

* * * * *